United States Patent Office 3,150,059
Patented Sept. 22, 1964

3,150,059
PENICILLIN DEACYLATION VIA ACTINO-
PLANACEAE FERMENTATION
Walter J. Kleinschmidt, Walter E. Wright, Frederick W.
Kavanagh, and William M. Stark, Indianapolis, Ind.,
assignors to Eli Lilly and Company, Indianapolis, Ind.,
a corporation of Indiana
No Drawing. Filed Dec. 26, 1962, Ser. No. 247,313
8 Claims. (Cl. 195—36)

The present invention relates to antibiotic substances. More particularly, it relates to an improved method for the preparation of penicillin nucleus from fermentation-produced penicillins.

All penicillins comprise the penicillin nucleus, 6-aminopenicillanic acid,

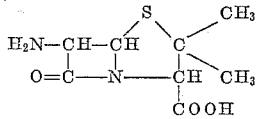

with an acyl group substituted upon the amino group in the 6-position, the various penicillins differing from one another in the particular acyl group. Thus, penicillin G is 6-phenylacetamidopenicillanic acid, penicillin K is 6-caprylamidopenicillanic acid, penicillin V is 6-phenoxyacetamidopenicillanic acid, and so on. All of the penicillins can be produced by the simple technique of acylating 6-aminopenicillanic acid with the appropriate acid chloride or acid anhydride, as disclosed by Doyle et al. in U.S. Patent 2,941,995 (June 21, 1960) and by others in the art. By this means, numerous types of penicillins can be obtained which are not available by fermentation processes.

In order to employ this method, it is of course necessary to have a source of penicillin nucleus. One source, described by Doyle et al. in U.S. Patent 2,941,995, involves carrying out a penicillin fermentation of the usual type, but without the addition of a side-chain precursor substance. This procedure, however, produces the desired nucleus in relatively low yield, and involves processing difficulties which impair its usefulness on a commercial scale.

The present invention affords a new and improved technique for the production of 6-aminopenicillanic acid, in which a penicillin derivable by fermentation means is deacylated with an enzyme system elaborated by microorganisms of the family Actinoplanaceae.

It is an object of the present invention to improve the preparation of 6-aminopenicillanic acid.

Another object is to prepare 6-aminopenicillanic acid more readily, cheaply, and conveniently.

Other objects of the invention and its advantages over the prior art will be apparent from the following description.

In accordance with the present invention, penicillin amidase is produced by growing microorganisms of the family Actinoplanaceae in a suitable culture medium, and the penicillin amidase produced thereby is contacted with a fermentation-derivable penicillin or a mixture of such penicillins under conditions effective to produce deacylation thereof.

In one embodiment of the invention, a microorganism of the genus Actinoplanes is grown under aerobic conditions in a culture medium containing assimilable carbon, nitrogen, and minerals. To the enzyme-containing culture thus obtained is added a quantity of fermentation-derived penicillin such as penicillin V, and the incubation is continued, preferably at a somewhat higher temperature effective at least partially to restrain the growth of the microorganisms. Under these conditions, the acyl side chain in the 6 position is removed rapidly, and the penicillin is converted largely into 6-aminopenicillanic acid, the conversion being readily followed by chromatographic means. When the 6-aminopenicillanic acid content of the medium reaches a maximum, the fermentation is discontinued, and the product is isolated in a known manner.

Penicillin amidase is produced by the Actinoplanaceae in association with both the mycelial material and the fermentation broth. It is feasible to separate the enzyme from the fermentation beer or its components by extraction or by other known means, and to employ the enzyme for the desired deacylation. Such an intermediate purification of the enzyme is by no means necessary, however, and the deacylation is preferably carried out with the whole fermentation beer, or alternatively with the filtered broth, or with the mycelia alone in a suitable buffering medium. From the standpoint of economy and convenience, the use of the unfiltered beer is the method of choice.

The production of penicillin amidase takes place readily and effectively under the conditions satisfactory for growth of the Actinoplanaceae, viz, a temperature between about 25 and about 30° C. and a pH between about 6.5 and about 8.0, with agitation and aeration. The culture medium should contain an assimilable carbon source such as sucrose, glucose, glycerol, or the like, a nitrogen source such as peptone, urea, ammonium sulfate, or the like, and the several inorganic salts found generally to be effective to promote the growth of microorganisms. Maximum yield of the enzyme is generally approached in from about 40 to about 60 hours, although a useful quantity of the enzyme is formed within a matter of hours after the beginning of the growth cycle, and persists for a considerable time after maximum growth has been reached. It will be understood that the amount of enzyme produced varies from species to species of the organism and in response to differences in growth conditions.

The conversion medium should initially contain a sufficient quantity of carbohydrate (e.g., 2 percent sucrose) to produce abundant growth of the Actinoplanaceae organisms. For the conversion itself, however, it is advantageous to minimize carbohydrates, a maximum concentration of one percent being preferred. Glycerol alone does not adequately support growth of the organisms, but excellent results in both growth and conversion are obtained with a medium containing 1 percent glycerol and 1 percent peanut meal. The organisms retain their effectiveness over many transfers in such a medium.

Any of the penicillins obtainable by fermentation with an organism of the genus Penicillium are suitable as the starting material in the present invention. They may be employed in the form of the free penicillin acid or preferably in the form of a water-soluble inorganic salt, such as the sodium, potassium, calcium, or ammonium salt. The purity of the penicillin employed is relatively unimportant. It can be added to the conversion medium in solid form or as a solution, preferably a concentrated aqueous solution. A particularly advantageous form is whole penicillin beer—i.e., the crude penicillin solution obtained by fermenting a suitable culture medium with a penicillin-producing organism. Such solutions can be employed either with or without treatment to remove the mycelia. Any of the penicillins obtained or obtainable by Penicillium fermentation can be treated succesfully in accordance with the present invention. Among such penicillins are benzyl penicillin (6-phenylacetamidopenicillanic acid, more commonly known as "penicillin G"), n-heptyl penicillin (6-caprylaminopenicillanic acid, "penicillin K"), phenoxymethyl penicillin (6-phenoxyacetamidopenicillanic acid, "penicillin V"), and other as described, for example in Behrens et al. U.S. Patents 2,479,295, 2,479,296, and 2,479,297

(August 16, 1949). Especially advantageous is p-tolyloxymethyl penicillin ("p-methyl penicillin V"), which is readily and rapidly converted to penicillin nucleus in high yield. Further examples of suitable penicillins include the following:

o, m, and p-Chlorobenzyl
o, m, and p-Fluorobenzyl
o, m, and p-Bromobenzyl
o, m, and p-Iodobenzyl
o, m, and p-Trifluoromethylbenzyl
o, m, and p-Nitrobenzyl
o, m, and p-Methoxybenzyl
o, m, and p-Tolyl
3,4-Dichlorobenzyl
2,4-Dichlorobenzyl
p-Methylphenoxymethyl
Phenylmercaptomethyl
Ethylmercaptomethyl
p-Tolylmercaptomethyl
p-Methylmercaptobenzyl
p-Methoxyphenoxymethyl
$\beta$-Naphthylmethyl
$\beta$-Naphthoxymethyl
6-Fluoro-$\beta$-naphthylmethyl
$\beta$-Naphthylmercaptomethyl
p-Allyloxybenzyl
2,6-Dimethoxybenzyl
p-Cyanobenzyl It is to be understood, however, that the foregoing list is illustrative only, and that the process of the invention is operative upon any penicillin which is produced by Penicillium fermentation or is capable of being produced thereby. Such penicillins, because of the mechanism of their origin, are free from any type of steric hindrance (e.g., from highly branched or charged substituents) which would interfere with the action of the penicillin amidase.

The penicillin employed as the starting material is preferably added to the culture of Actinoplanaceae after the latter has been incubated for at least about 24 hours. The concentration of penicillin in the conversion medium can vary widely without detracting materially from the effectiveness of the conversion. The concentration will generally range from about 5 to about 15 mg./ml. for maximum utilization of the penicillin amidase and for substantially complete decylation. Lower concentrations can be employed, but may not make full use of the amidase values present in the medium. Higher concentrations (e.g., up to 50 mg./ml. or above) can also be employed, but may not undergo complete deacylation without an extended fermentation time. This is not a serious problem, however, since the conversion tends to stop short of the theoretical level in any event, and for this reason it is always desirable to separate unconverted penicillins by extraction in a conventional manner prior to recovery of the penicillin nucleus. The penicillins thus recovered are conveniently recycled for further treatment.

The conversion of penicillins to penicillin nucleus according to the present invention proceeds most satisfactorily at pH conditions in the neutral range, suitably between about 6 and about 9, preferably between about 6.5 and about 8.5, and optimally between about 7.5 and about 8. The rate of destruction of penicillin increases with pH, while the rate of formation of penicillin nucleus decreases with pH, and these tendencies are balanced most satisfactorily just above the neutral range. The pH tends to decrease progressively during the fermentation; it is convenient, therefore, to adjust the medium initially to pH 8–9 and to add sodium hydroxide or other base from time to time to hold the pH in the desired range. It is especially convenient, in large-scale fermentations, to add calcium carbonate to the medium in the proportion of 1 to 2 wt.-percent or more to aid in pH maintenance.

The conversion can be carried out over a considerable range of temperatures, e.g., around 20 to 50° C., preferably 25 to 45° C. If the conversion is carried out in a nonsterile medium (e.g., in the presence of the Actinoplanaceae themselves), it is desirable to operate at a somewhat elevated temperature to repress growth of the organisms. For this purpose, temperatures above about 32° C. can be employed, preferably from about 32 to about 40° C.

The Actinoplanaceae are a new family of microorganisms of the order Actinomycetales, having been first described by Dr. John N. Couch (Jour. Elisha Mitchell Sci. Soc., 65, 315–318 (1949); 66, 87–92 (1950); Trans. New York Acad. Sci., 16, 315–318 (1954); Jour. Elisha Mitchell Sci. Soc., 71, 148–155 and 269 (1955); Bergey's Manual of Determinative Bacteriology, seventh edition, 825–829 (1957)). They form inconspicuous vegetative mycelia in water on a variety of plant and animal parts, and reproduce by spores formed in sporangia, the spores varying in flagellation and motility, and conidia being formed in many species. The organisms are widely distributed in the soil and fresh water, and are culturable in a variety of natural and artificial media. Five genera have thus far been distinguished.

The type genus, I, Actinoplanes, comprises aerobic, gram-positive, brilliant orange organisms with flagellated, motile spores, lacking aerial mycelia and coiled conidiophores.

Genus II, Streptosporangium, is nonpigmented and has abundant aerial mycelia, nonmotile sporangiphores, and (in some species) coiled conidiophores as well as sporangia.

Genus III, Ampullaria, has sporangia which are bottle-shaped, flask-shaped, digitate, or otherwise irregular; further distinguished by motile, rod-shaped, planospores with one polar flagellum, arranged end-to-end in longitudinal rows within the sporangium; grown saprophytically on a variety of plant and animal material; widely distributed in soils.

Genus IV, Spirillospora, has weakly motile spores which range from short to long rods to spiral in shape, developed from one or more coils in the sporangium; mycelia white to pale yellowish, simulating Streptosporangium; hyphae 0.2–1 micron in diameter; sporangia spherical to vermiform.

Genus V, Amorphosporangium, has sporangia of very irregular shape; spores short rods, nonmotile.

Among the species and varieties of the Actinoplanaceae which have been isolated and characterized are the following: *Actinoplanes utahensis, Actinoplanes missouriensis, Actinoplanes philippinensis, Streptosporangium roseum, Streptosporangium roseum* var. *hollandensis, Streptosporangium album, Streptosporangium viridialbum, Streptosporangium amethystogenes, Ampullaria regularis, Ampullaria campanulata, Ampullaria lobata, Ampullaria digitata, Spirillospora albida,* and *Amorphosporangium auranticolor.*

The Actinoplanaceae are operable as a group in the process of the present invention, although of course with varying degrees of effectiveness for the desired conversion. Best results have thus far been achieved with the type genus Actinoplanes, of which the species *Actinoplanes utahensis* is preferred. The other genera and species noted above are also operable. Cultures of representative species of the organisms have been deposited with the American Type Cultural Collection, from which they are available to the public, under accession numbers as follows:

*Actinoplanes missouriensis* _____ ATCC 14538
*Actinoplanes utahensis* _____ ATCC 14539
*Streptosporangium roseum* var. *hollandensis* _____ ATCC 14540
*Ampullaria regularis* _____ ATCC 14541
*Spirillospora albida* _____ ATCC 14542
*Amorphosporangium auranticolor* _____ ATCC 14543

The effectiveness of any given strain of organisms of the family Actinoplanaceae for deacylating penicillins is readily demonstrated by the following procedure. A suitable growth medium such as Czapek's peptone agar is inoculated with the microorganism, and is incubated at 28° C. for two days on a rotary shaker. A 25-ml. portion of the resulting beer is filtered to remove the mycelia, and the mycelia are resuspended in 5 ml. of 0.05 M pH 7.0 potassium phosphate buffer in a 50-ml. Erlenmeyer flask. To the suspension is added a solution of potassium penicillin V in 0.05 M pH 7.5 potassium phosphate buffer at a level to give a final concentration of 3 mg./ml. and a final volume of 10 ml. Finally, about 0.2 ml. of toluene is added. The flask is shaken on a rotary shaker at 250 r.p.m. for about 17 hours at 37° C. The supernatant liquid is thereafter tested qualitatively for penicillin nucleus by two methods: (1) acylation in a test tube with phenoxyacetyl chloride, followed by paper chromatography of the supernatant phase for penicillin V using a 70 percent propanol solvent system, and (2) paper electrophoresis followed by acylation on paper with phenoxyacetyl chloride and detection of penicillin V via bioautograph.

*Cultures.*—The Actinoplanaceae are readily maintained by slant-to-slant transfer on a medium of the following composition:

| | Percent |
|---|---|
| Bacto-Soytone | 1.0 |
| Bacto-Dextrose | 1.0 |
| Bacto-Agar | 1.5 |
| Tap water | Remainder |

The freshly inoculated slants are incubated at 28° C. for seven or eight days and stored at 4° C. until used. Pellets of the culture can conveniently be lyophilized, if desired, for storage at ordinary temperatures.

*Inoculum.*—A variety of media can be used to prepare inoculum for fermentors. A convenient and inexpensive medium comprises 2 percent sucrose, 1 percent soybean meal flour, and 1 percent peanut meal suspended in tap water. The medium is dispensed into 100 ml. Erlenmeyer flasks and sterilized by heating at about 120° C. for about 20 minutes. Each flask is inoculated with a lyophilized pellet or with organisms scraped from about one-fourth of a slant and is incubated for two or three days at 28° C. on a rotary shaker, during which time luxuriant growth takes place.

Each of the vegetative flasks is used as inoculum for 800 ml. of medium in a 2-liter flask, which is similarly incubated. The resulting culture is commonly referred to in the fermentation art as the "bump" stage.

*Fermentor.*—Two bump stage flasks are thereafter used for inoculating 44 liters of medium in a 60-liter fermentor. The fermentors are incubated at around 28° C. with agitation at around 350 r.p.m. and aeration at around 1 volume of air per volume of medium per minute.

In every stage of culture preparation, it is found that the culture approaches maximum activity at about 40 to about 60 hours. It is active for penicillin deacylation almost from the beginning of the incubation, but the rate of deacylation is quite low during the early stages, and increases rapidly up to around 36 to 48 hours. The equilibrium conversion tends to be roughly constant, regardless of the point at which the penicillin is added to the culture, but the conversion is much more rapid if the penicillin addition is withheld until around 48 hours.

*Conversion.*—The desired penicillin substrate is added to the vegetative culture in the form of the solid penicillin or as a solution thereof in water, an organic solvent, or a mixture thereof, or in the form of penicillin beer, filtered or unfiltered. The concentration of penicillin is generally in the range of about 5 to about 15 mg./ml. (expressed as penicillin V), although substantially lower and higher proportions can be used if desired. The overall yield of penicillin nucleus, based upon starting material, increases with the decreasing concentrations of penicillin, while the production of penicillin nucleus per unit volume of conversion medium and also the degree of utilization of the penicillin amidase increase with increasing concentrations of starting material up to at least about 50 mg./ml. (as penicillin V). Maximum yields, of the order of 80 percent, are obtainable at about 10 mg./ml.

Upon addition of the penicillin, the incubation temperature should preferably be raised to the range of about 32 to about 50° C., under which conditions the further vegetative growth of the microorganisms is inhibited, the enzyme system is released from the mycelia, and the desired deacylation goes forward rapidly. The deacylation under these conditions approaches a maximum in only 10 to 20 additional hours, at the end of which time the incubation is discontinued. It is convenient at this point to subject the medium to pasteurization at around 70° C. for about one-half hour in order to halt any further growth of the Actinoplanaceae or of any contaminating organisms.

The whole broth is thereupon filtered to remove the microorganisms and any other suspended matter, employing a suitable proportion of a diatomaceous filter aid, generally around 2 or 3 percent by weight.

*Product Recovery.*—The technique employed for isolation of the penicillin nucleus from the filtered broth will vary somewhat depending upon the proportion of extraneous materials therein.

When the broth has a relatively low concentration of extraneous materials, it is first acidified to about pH 2.5 with hydrochloric acid, sulfuric acid, or the like, and unreacted penicillin is extracted with butyl acetate, amyl acetate, or other selective penicillin solvent. The aqueous phase is then adjusted to pH 6.5 with potassium hydroxide and concentrated at ordinary temperature and reduced pressure to around one-fifth its volume. The concentrate is diluted with about three volumes of acetone with constant stirring, and the resulting flocculent, gummy precipitate is filtered off and discarded. For the dilution, other water-miscible oxygen-containing organic liquids may be used, such as methanol, isopropyl alcohol, and the like, and the proportion employed may vary widely. The filtrate is again evaporated to about one-thirtieth of the original volume of filtered broth. The concentrate is acidified to pH 4.3 and seeded with crystalline 6-aminopenicillanic acid. The crystalline 6-amino-penicillanic acid thus formed is filtered off, washed with water, then with acetone, and dried.

When the deacylation broth contains a relatively large portion of impurities, it is sometimes advisable to effect a preliminary purification and concentration by adsorption on an ion-exchange resin or active carbon or the like, followed by elution with dilute hydrochloric acid, sulfuric acid, phosphoric acid, acidic phosphate buffer, or the like. The eluate obtained thereby is processed as described above.

Numerous variants and extensions of the above procedure will be readily apparent.

The invention will be more clearly understood from the following operating examples, which are intended to be illustrative only, and not as limitations on the scope of the invention.

*Example 1*

A 68-liter fermentor was charged with 44 liters of a medium having the following composition:

| | | |
|---|---|---|
| Peanut meal | g | 10 |
| Peptone (Wilson) | g | 5 |
| $KH_2PO_4$ | g | 0.5 |
| $K_2HPO_4$ | g | 1.2 |
| $MgSO_4 \cdot 7H_2O$ | g | 0.25 |
| P-2000 (Dow) polyalkylene glycol antifoam | ml | 1 |
| Tap Water | liter | 1 |

The fermentor was sterilized at 121° C. for 20 minutes, cooled to 28° C., and inoculated with 1600 ml. of a second-stage vegetative inoculum of *Actinoplanes utahensis*. Fermentation was carried out at 28° C. with agitation at 350 r.p.m. and aeration at 1.0 volume of air per volume per minute. At the end of 45 hours, 440 g. of sterile potassium penicillin V were added, the pH was adjusted to between 7 and 7.5, the temperature was raised to 34° C., and the incubation was continued under the same conditions of agitation and aeration. The incubation was discontinued at 68 hours total elapsed time, and the beer was assayed. The final content of total penicillins was measured in terms of penicillin V equivalent. The beer was found to contain 7.9 mg./ml. of total penicillins (including penicillin nucleus) expressed as penicillin V, and 2.6 mg./ml. of penicillin nucleus. This corresponds to a conversion of 45 mole-percent, based upon the initial concentration of penicillin V (10.3 mg./ml.).

Example 2

Another fermentation was carried out according to the procedure of Example 1, but with addition to the medium of 30 g. of sucrose per liter of tap water.

The final beer contained 7.4 mg./ml. of total penicillins and 2.8 mg./ml. of penicillin nucleus, corresponding to a conversion of 49 mole-percent based upon the initial penicillin V concentration (10.5 mg./ml.).

Example 3

Another fermentation was carried out according to the procedure of Example 1, but with addition to the medium of 20 g. of glycerol per liter of tap water.

The final beer contained 8.3 mg./ml. of total penicillins and 3.4 mg./ml. of penicillin nucleus, corresponding to a conversion of 59 mole-percent based upon the original penicillin V concentration (10.3 mg./ml.).

Example 4

The penicillin amidase elaborated by the Actinoplanaceae is found in both the mycelia and the fermentation broth, as demonstrated by the following shaker-flask experiments.

*Actinoplanes utahensis* was grown for four days at 28° C. in shaker flasks in media defined below.

The mycelia from 100 ml. of beer were removed, dried with acetone, and resuspended in 50 ml. of M/10 pH 7.5 phosphate buffer containing 5.5 mg./ml. of penicillin V. A few drops of toluene were added, and the mixture was incubated at 34° C. for 18 hours on a shaker.

The mycelia-free broth was tested in a parallel manner. It was adjusted to pH 7.5, penicillin V was added to a concentration of 4.9 mg./ml., a few drops of toluene were added, and the mixture was allowed to stand at 37° C. for 18 hours.

Assays for concentration of 6-aminopenicillanic acid were carried out at the end of the incubation.

In one pair of tests, the medium and results were as follows:

Medium

| | |
|---|---|
| Potato dextrin | g-- 30 |
| Glucose | g-- 20 |
| Soybean meal flour | g-- 20 |
| Yeast | g-- 5 |
| CaCO$_3$ | g-- 3 |
| Tap water | liter-- 1 |

Results

| | Mycelia | Broth |
|---|---|---|
| Initial penicillin V, mg./ml | 5.5 | 4.9 |
| Final penicillin nucleus, mg./ml | 0.35 | 0.34 |
| Conversion, mole-percent | 11 | 12 |

In another pair of tests, employing a different medium, the medium and results were as follows:

Medium

| | |
|---|---|
| Sucrose | g-- 30 |
| Bacto-peptone | g-- 5 |
| K$_2$HPO$_4$ | g-- 1 |
| MgSO$_4$·7H$_2$O | g-- 0.5 |
| KCl | g-- 0.5 |
| FeSO$_4$·7H$_2$O | mg-- 5 |
| Tap water | liter-- 1 |

Results

| | Mycelia | Broth |
|---|---|---|
| Initial penicillin V, mg./ml | 5.5 | 4.9 |
| Final penicillin nucleus, mg./ml | 0.73 | 0.27 |
| Conversion, mole-percent | 24 | 10 |

Example 5

The following example demonstrates the effectiveness of whole Actinoplanes fermentation broth as a practical source of enzyme. The organism, *Actinoplanes utahensis*, was grown in shaking flasks as described in Example 4, employing the second fermentation medium described therein. Then, at the times designated below, penicillin V was added, the incubation temperature was raised to 34° C., and the shaking was continued for 16 to 18 hours, at the end of which time the flasks were sampled for assay.

The reslts are given in the table below. "Total penicillins" represent the sum of the penicillin nucleus and the unconverted penicillin V in the flasks at completion of the incubation periods. The penicillin nucleus concentration represents a measure of the effective concentration of penicillin amidase in the fermentation medium at the time of introducing penicillin V.

| Time of adding penicillin V, hr | 48 | 72 |
|---|---|---|
| Total penicillins, mg./ml | 8.2 | 6.0 |
| Penicillin nucleus, gm./ml | 1.2 | 0.66 |
| Conversion, mole-percent | 26 | 21 |

Example 6

The satisfactory use of penicillin beer, either whole or filtered, as a source of the penicillin substrate is demonstrated by the following series of tests.

The materials employed were a typical penicillin V beer (both whole and filtered), prepared with a corn steep-lactose medium, and a 45-hour vegetative culture of *Actinoplanes utahensis* in the glycerol-peanut meal-peptone medium of Example 3, fermentation having been carried out at 28° C., 350 r.p.m., and 0.94 volume of air per volume of medium per minute.

The penicillin and Actinoplanes beers were mixed in varying proportions, dispensed into flasks in duplicate to a volume of 100 ml. per flask, adjusted to pH 7.5-7.7, and buffered with 10 ml. of 0.4 M pH 7.5 phosphate buffer. The flasks were shaken at 34° C. for 20 hours, and were then assayed for residual penicillin V and for penicillin nucleus. The results were as follows, computed from the initial penicillin beer assay of 3.96 mg. per ml.:

| Actino. broth, ml. | Pen. Filt., ml. | Beer Whole, ml. | Pen. V Initial, mg./ml. | Assay Final, mg./ml. | Pen. Nucleus, mg./ml. | Conversion, on initial Pen. V, mole-percent |
|---|---|---|---|---|---|---|
| 5 | 95 | | 3.75 | 2.40 | 0.47 | 21 |
| 10 | 90 | | 3.55 | 2.40 | 0.75 | 34 |
| 20 | 80 | | 3.15 | 1.99 | 0.99 | 51 |
| 30 | 70 | | 2.76 | 1.52 | 0.90 | 53 |
| 50 | 50 | | 1.98 | 1.24 | 0.67 | 55 |
| 5 | | 95 | 3.75 | 2.14 | 0.35 | 15 |
| 10 | | 90 | 3.55 | 1.97 | 0.49 | 22 |
| 20 | | 80 | 3.15 | 1.63 | 0.62 | 32 |
| 30 | | 70 | 2.76 | 1.50 | 0.62 | 36 |
| 50 | | 50 | 1.98 | 1.19 | 0.54 | 44 |

Example 7

The following example illustrates the recovery of penicillin nucleus from the crude fermentation product of the present invention.

Into a 68-liter fermentor were introduced 44 liters of a medium having the composition

| | Wt.-percent |
|---|---|
| Glycerol | 1.0 |
| Peanut meal | 1.0 |
| Peptone (Wilson) | 0.5 |
| $KH_2PO_4$ | 0.05 |
| $K_2HPO_4$ | 0.12 |
| $MgSO_4$ | 0.025 | plus 0.1 wt.-percent of P–2000 (Dow), a polyalkylene glycol antifoam agent, and the medium was sterilized 20 minutes at 121° C. The sterile medium was inoculated with 1600 ml. of a second-stage vegetative culture of *Actinoplanes utahensis*, then incubated at 28° C. The aeration rate was initially 0.4 ft.$^3$/min., and was raised to 0.8 ft.$^3$/min. at 6 hours and finally to 1.4 ft.$^3$/min. at 16 hours. Agitation was started at 6 hours at 250 r.p.m., and was raised at 12 hours to 350 r.p.m. Lard oil was added from time to time to help in controlling foaming. At 45 hours, 440 g. of potassium penicillin V were added (about 9.0 mg./ml. as penicillin V acid) and the incubation was resumed at 34° C. with control of pH at 7.5 The fermentation product was harvested after 23 additional hours of incubation. Chemical assays for β-lactam were carried out on the fermentation liquid at various intervals after the addition of potassium penicillin V, with the following results, expressed as units of penicillin G:

| Time | Total Penicillins, units/ml. | Penicillin Nucleus, units/ml. |
|---|---|---|
| 10 min | 16,100 | 0 |
| 3 hr | 15,450 | 5,430 |
| 23 hr | 13,160 | 12,060 |

To the beer, measuring 37 liters, were added 700 g. of Super-Cel filter aid and the mixture was filtered. The filtrate measured 31.5 liters in volume.

Twelve liters of the filtrate were adjusted to pH 2.2 with 20 percent sulfuric acid and extracted with 3.0 liters of amyl acetate to remove unconverted penicillin V. The extracted aqueous phase, measuring 9.3 liters, was neutralized with aqueous 20 percent potassium hydroxide solution.

Six liters of the neutralized aqueous phase were concentrated under vacuum at 30° C. to 1200 ml. Half of the concentrate was mixed with 1800 ml. of 95 percent ethanol, and the resulting flocculant precipitate was filtered off and discarded (dry weight 47 g.)

The aqueous ethanol filtrate was concentrated to 200 ml. (assay, 121,200 units per milliliter as penicillin G), acidified to pH 4.3 with approximately 3 N hydrochloric acid, and seeded with crystalline 6-aminopenicillanic acid. The resulting crop of crystals was filtered off, washed with water, then with acetone, and dried. The crystals weighed 8.0 g. and assayed 95 percent 6-aminopenicillanic acid.

Example 8

A vegetative culture of *Actinoplanes missouriensis* was prepared by growing the organism in 700 ml. of modified peptone Czapek's medium in a 2-liter shaking flask at 28° C. for 48 hours. The culture was then fed 7.4 g. of potassium p-tolyloxymethyl penicillin plus 28 g. of sodium citrate, and the flask was shaken at 34° C. for approximately 18 hours. At this point, approximately 285 ml. of the whole broth was withdrawn and filtered. The filtrate was found to have a chemical assay of 10,650 units per milliliter expressed as penicillin G. The filtrate was acidified to pH 2.2 and extracted twice with one-half volume portions of amyl acetate. The aqueous portion was adjusted to approximately pH 7, and was found to have a chemical assay of 3,675 units per milliliter as penicillin G, this being the penicillin nucleus content of the fermentation product.

Example 9

A vegetative culture of *Actinoplanes missouriensis* was prepared by growing the microorganism in 700 ml. of modified peptone Czapek's medium in a 2-liter shaking flask at 28° C. for approximately 48 hours. At the end of this time, approximately half of the culture was poured off for use in another test. To the remaining culture were added 3.5 g. of potassium p-tolyloxymethyl penicillin, after which the culture was sampled, filtered, and assayed. It was found to contain 15,300 units per milliliter, expressed as penicillin G, determined by chemical assay. The flask was then incubated with shaking at 28° C., the pH being adjusted to 7.0 from time to time. At the end of 20 hours, a sample was removed, filtered, assayed, and found to contain 10,880 units per milliliter. The filtrate was extracted twice at pH 2.2 with 50-ml. portions of amyl acetate. The extracted aqueous phase was adjusted to pH 7.5, reassayed, and found to contain 4,030 units per milliliter. The latter represents the penicillin nucleus content of the filtration product.

Example 10

The conversion of a series of penicillins by the process of the present invention was studied according to the following procedure. In each case, 10 ml. of a six-day vegetative culture of *Actionplanes missouriensis* in modified peptone Czapek's medium was placed in a 50-ml. Erlenmeyer flask, and to the culture were added 20 mg. of the desired penicillin in the form of the potassium salt, plus 0.05 ml. of toluene. The culture was then placed in a static incubator at 37° C. for approximately 18 hours, after which it was filtered and subjected to paper chromatographic analysis in duplicate. One of the chromatograms was sprayed with a solution of phenylacetyl chloride to develop the penicillin nucleus spot, and both chromatograms were then subjected to bioautographic assay.

The results of the various tests were as follows:

p-Bromophenoxymethyl penicillin was converted almost completely into penicillin nucleus.

Cyclopentylmethyl penicillin (5 mg. tested) gave penicillin nucleus in low conversion.

m-Tolylmercaptomethyl penicillin gave penicillin nucleus in good conversion.

2-thienylmercaptomethyl penicillin gave penicillin nucleus in moderate conversion.

Crotylmercaptomethyl penicillin gave penicillin nucleus in good conversion.

sec.-Butylmercaptomethyl penicillin gave penicillin nucleus in moderate conversion.

Benzyl penicillin (penicillin G) gave penicillin nucleus in low conversion.

Example 11

This and the following examples illustrate the operability of other genera of the Actinoplanaceae for the production of penicillin nucleus.

A 25-ml. portion of a vegetative culture of *Streptosporangium roseum* was filtered, and the cells were resuspended in 5 ml. of 0.05 M potassium phosphate buffer at pH 7.0. To the suspension were added 30 mg. of penicillin V dissolved in 5 ml. of 0.05 M potassium phosphate buffer (pH 7.5), followed by around 0.2 ml. of toluene. The completed mixture was shaken in a 50-ml. Erlenmeyer flask on a rotary shaker for 17 hours at 37° C. and 250 r.p.m. The incubated material was filtered and the filtrate was tested for the presence of penicillin nucleus by two methods: (1) paper chromatography, before and after acylation with phenoxyacetyl chloride, using an aqueous 70 percent propanol solvent system, the presence of penicillin V being demonstrated by bioautograph, and (2) paper electrophoresis followed by acylation on paper and bioautograph. Substantial conversion to penicillin nucleus was demonstrated by both of these methods.

Example 12

*Ampullaria regularis*, ATCC 14541, was tested according to the procedure of Example 11 and found to cause substantial conversion of penicillin V to penicillin nucleus.

Example 13

*Spirillospora albida*, ATCC 14542, was tested according to the procedure of Example 11 and found to cause substantial conversion of penicillin V to penicillin nucleus.

Example 14

*Amorphosporangium auranticolor*, obtained by selective subculture of ATCC 14543, was tested generally according to the procedure of Example 11 and found to cause substantial conversion of penicillin V to penicillin nucleus at incubation times of 1 and 2 hours. During more prolonged incubation, the organism appeared to elaborate an additional enzyme, believed to be a β-lactamase, which tended to destroy the penicillin nucleus. Limitation of the incubation time with this organism is thus indicated.

We claim:

1. A method for producing 6-aminopenicillanic acid from a penicillin of the class produced by growth of a microorganism of the genus Penicillium in a culture medium suitable for the growth thereof, which comprises exposing said penicillin in an aqueous medium to the action of a penicillin amidase elaborated by a microorganism of the family Actinoplanaceae, said exposure being at a temperature between about 20 and about 50° C. and at a pH between about 6 and about 9 for a time sufficient to effect substantial conversion of said penicillin to 6-aminopenicillanic acid.

2. A method for producing 6-aminopenicillanic acid from a penicillin of the class produced by growth of a microorganism of the genus Penicillium in a culture medium suitable for the growth thereof, which comprises exposing said penicillin in an aqueous medium to the action of a penicillin amidase elaborated by a microorganism of the genus Actinoplanes, said exposure being at a temperature between about 20 and about 50° C. and at a pH between about 6 and about 9 for a time sufficient to effect substantial conversion of said penicillin to 6-aminopenicillanic acid.

3. A method for producing 6-aminopenicillanic acid from a penicillin of the class produced by growth of a microorganism of the genus Penicillium in a culture medium suitable for the growth thereof, which comprises incubating said penicillin in an aqueous medium prepared by growing a microorganism of the genus Actinoplanes in a culture medium effective for growth thereof, said incubation being at a temperature between about 25 and about 45° C. and at a pH between about 6.5 and about 8.5 for a time sufficient to produce substantial deacylation of said penicillin, and recovering the 6-aminopenicillanic acid thus produced.

4. A method for producing 6-aminopenicillanic acid from a penicillin of the class produced by growth of a microorganism of the genus Penicillium in a culture medium suitable for the growth thereof, which comprises incubating said penicillin in a whole fermentation beer prepared by growing a microorganism of the genus Actinoplanes in a culture medium effective for growth thereof, said incubation being at a temperature between about 32 and about 40° C. and at a pH between about 7.5 and about 8 for a time sufficient to produce substantial deacylation of said penicillin, and recovering the 6-aminopenicillanic acid thus produced.

5. A method for producing 6-aminopenicillanic acid which comprises growing a microorganism of the genus Actinoplanes in a culture medium containing assimilable carbon, nitrogen, and minerals, adding thereto penicillin V to a concentration between about 5 and about 15 mg./ml., incubating the resulting mixture at a temperature between about 32 and about 40° C. and at a pH between about 7.5 and about 8 for a time sufficient to produce substantial deacylation of said penicillin V, and recovering the 6-aminopenicillanic acid thus produced.

6. The method of claim 5 wherein said microorganism is *Actinoplanes utahensis*.

7. A method for producing 6-aminopenicillanic acid which comprises growing a microorganism of the genus Actinoplanes in a culture medium containing assimilable carbon nitrogen, and minerals, adding thereto p-methylpenicillin V to a concentration between about 5 and about 15 mg./ml., incubating the resulting mixture at a temperature between about 32 and about 40° C. and at a pH between about 7.5 and about 8 for a time sufficient to produce substantial deacylation of said p-methylpenicillin V, and recovering the 6-aminopenicillanic acid thus produced.

8. The method of claim 7 wherein said microorganism is *Actinoplanes utahensis*.

References Cited in the file of this patent

UNITED STATES PATENTS

| | | |
|---|---|---|
| 3,014,846 | Robinson et al. | Dec. 26, 1961 |
| 3,070,511 | Weitnauer | Dec. 25, 1962 |